(12) United States Patent
Pezeshki et al.

(10) Patent No.: US 12,041,692 B2
(45) Date of Patent: Jul. 16, 2024

(54) USER EQUIPMENT (UE) CAPABILITY REPORT FOR MACHINE LEARNING APPLICATIONS

(71) Applicant: QUALCOMM Incorporated, San Diego, CA (US)

(72) Inventors: Hamed Pezeshki, San Diego, CA (US); Tao Luo, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/496,650

(22) Filed: Oct. 7, 2021

(65) Prior Publication Data

US 2022/0116764 A1 Apr. 14, 2022

Related U.S. Application Data

(60) Provisional application No. 63/090,141, filed on Oct. 9, 2020.

(51) Int. Cl.
| | |
|---|---|
| H04W 8/22 | (2009.01) |
| G06N 20/00 | (2019.01) |
| H04W 72/121 | (2023.01) |
| H04W 72/20 | (2023.01) |

(52) U.S. Cl.
CPC .............. *H04W 8/22* (2013.01); *G06N 20/00* (2019.01); *H04W 72/121* (2013.01); *H04W 72/20* (2023.01)

(58) Field of Classification Search
CPC ..... H04W 8/22; H04W 72/20; H04W 72/121; G06N 20/00

USPC .......................................................... 455/418
See application file for complete search history.

(56) References Cited

U.S. PATENT DOCUMENTS

| | | | |
|---|---|---|---|
| 2020/0175422 A1* | 6/2020 | Zhang | ..................... G06N 20/20 |
| 2021/0160149 A1* | 5/2021 | Ma | ........................ H04W 28/26 |

OTHER PUBLICATIONS

"3rd Generation Partnership Project, Technical Specification Group Services and System Aspects, Study on enablers for network automation for the 5G System (5GS), Phase 2 (Release 17)", 3GPP Standard, Technical Report, 3GPP TR 23.700-91, Sep. 11, 2020, 304 Pages.
3rd Generation Partnership Project, Technical Specification Group Services and System Aspects, Study on Traffic Characteristics and Performance Requirements for AI/ML Model Transfer in 5GS (Release 18), 3GPP Standard, Technical Report, 3GPP TR 22.874, 3GPP TR 23.700-91, Oct. 6, 2020, pp. 1-55.

(Continued)

*Primary Examiner* — Joel Ajayi
(74) *Attorney, Agent, or Firm* — Seyfarth Shaw LLP

(57) ABSTRACT

A method of wireless communication by a user equipment (UE) receives a machine learning model from a base station. The UE reports, to the base station, a machine learning processing capability. The UE also transmits, to the base station, gradient updates or weight updates to the machine learning model. A base station transmits a machine learning model to a number of UEs. The base station receives, from each of the number of UEs, a machine learning processing capability report. The base station groups a number of UEs in accordance with the machine learning processing capability reports, to receive gradient updates to the machine learning model.

29 Claims, 10 Drawing Sheets

(56) References Cited

OTHER PUBLICATIONS

Intel: "KI#19, Sol#56: Update to Add Model and Local Training Data Update Service", S2-2007725, 3rd Generation Partnership Project, Elbonia, Oct. 12, 2020-Oct. 23, 2020, 7 Pages.
International Search Report and Written Opinion—PCT/US2021/054239—ISA/EPO—Jan. 21, 2022.
OPPO: "FS_AMMT: Annex—General principle of Federated Learning over 5GS", 3GPP TSG-SA WG1 e-Meeting #91, S1-203146, 3rd Generation Partnership Project, Aug. 24, 2020-Sep. 2, 2020, 4 Pages.

* cited by examiner

USER EQUIPMENT (UE) CAPABILITY REPORT FOR MACHINE LEARNING APPLICATIONS

CROSS-REFERENCE TO RELATED APPLICATION

The present application claims the benefit of U.S. Provisional Patent Application No. 63/090,141, filed on Oct. 9, 2020, and titled "USER EQUIPMENT (UE) CAPABILITY REPORT FOR MACHINE LEARNING APPLICATIONS," the disclosure of which is expressly incorporated by reference in its entirety.

FIELD OF THE DISCLOSURE

Aspects of the present disclosure generally relate to wireless communications, and more particularly to techniques and apparatuses for user equipment (UE) capability reports for machine learning applications.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to aspects of the present disclosure, a method of wireless communication receives a machine learning model from a base station. The method reports, to the base station, a machine learning processing capability. The method also transmits, to the base station, gradient updates or weight updates to the machine learning model.

In other aspects of the present disclosure, a method of wireless communication transmits a machine learning model to a number of user equipment (UEs). The method receives, from each of the UEs, a machine learning processing capability report. The method also groups a number of UEs in accordance with the machine learning processing capability reports, to receive gradient updates to the machine learning model.

In other aspects of the present disclosure, an apparatus for wireless communications at a user equipment (UE) includes a processor and memory coupled with the processor. Instructions stored in the memory are operable, when executed by the processor, to cause the apparatus to receive a machine learning model from a base station. The apparatus can report, to the base station, a machine learning processing capability. The apparatus can also transmit, to the base station, gradient updates or weight updates to the machine learning model.

In other aspects of the present disclosure, an apparatus for wireless communications at a base station includes a processor and memory coupled with the processor. Instructions stored in the memory are operable, when executed by the processor, to cause the apparatus to transmit a machine learning model to a number of user equipment (UEs). The apparatus can receive, from each of the UEs, a machine learning processing capability report. The apparatus can also group a number of UEs in accordance with the machine learning processing capability reports, to receive gradient updates to the machine learning model.

In other aspects of the present disclosure, a user equipment (UE) for wireless communications includes means for receiving a machine learning model from a base station. The UE includes means for reporting, to the base station, a machine learning processing capability. The UE also includes means for transmitting, to the base station, gradient updates or weight updates to the machine learning model.

In still other aspects of the present disclosure, a base station for wireless communications includes means for transmitting a machine learning model to a number of user equipment (UEs). The base station includes means for receiving, from each of the number of UEs, a machine learning processing capability report. The base station also includes means for grouping a number of UEs in accordance with the machine learning processing capability reports, to receive gradient updates to the machine learning model.

In yet other aspects of the present disclosure, a non-transitory computer-readable medium with program code recorded thereon is disclosed. The program code is executed by a user equipment (UE) and includes program code to receive a machine learning model from a base station. The UE includes program code to report, to the base station, a machine learning processing capability. The UE also includes program code to transmit, to the base station, gradient updates or weight updates to the machine learning model.

In other aspects of the present disclosure, a non-transitory computer-readable medium with program code recorded thereon is disclosed. The program code is executed by a base station and includes program code to transmit a machine learning model to a number of user equipment (UEs). The base station includes program code to receive, from each of the number of UEs, a machine learning processing capability report. The base station also includes program code to group a number of UEs in accordance with the machine learning processing capability reports, to receive gradient updates to the machine learning model.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
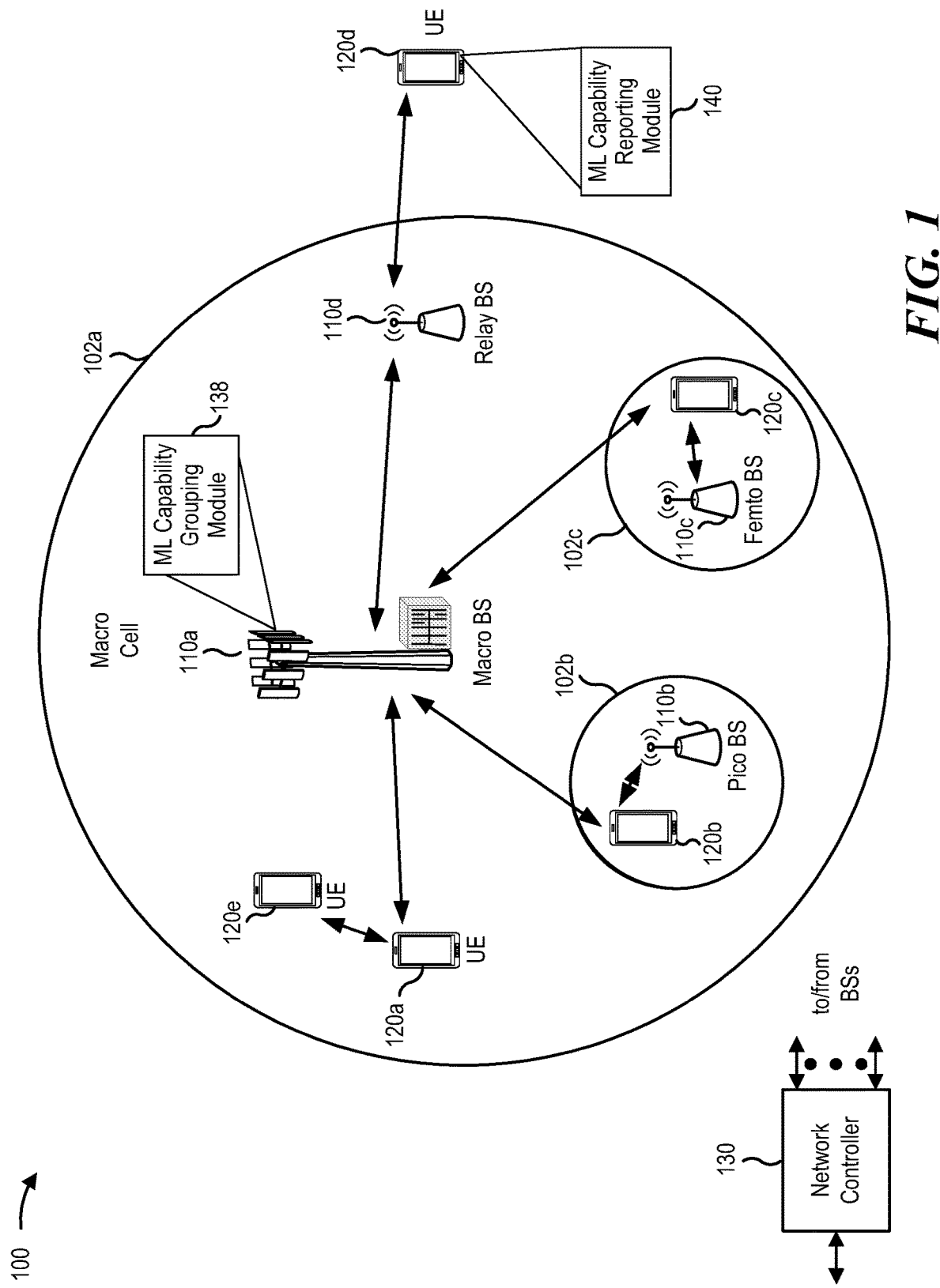
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Standard machine learning approaches centralize training data on one machine, or in a data center. A federated learning model supports collaborative learning of a shared prediction model among user equipment (UEs) and a base station (or centralized server). Federated learning is a process where a group of UEs receives a machine learning model from a base station and work together to train the model. More specifically, each UE trains the model locally, and sends back either updated neural network model weights or gradient updates from, for example, a locally performed stochastic gradient descent process. The base station receives the updates from all of the UEs in the group and aggregates them, for example by averaging them, to obtain updated global weights of the neural network. The base station sends the updated model to the UEs, and the process repeats, round after round, until a desired performance level from the global model is obtained.

In each round of a federated learning process, a group of UEs sends back weights or gradient updates within a given time interval after they receive the model from the base station. If a UE misses the deadline for sending updates, the weights or gradients will become stale, and the base station will not incorporate the update in the weight or gradient aggregation for that local training round of the federated learning process.

According to aspects of the present disclosure, a UE reports its machine learning processing capability to the base station. In some aspects, the report may indicate a machine learning hardware capability. In other aspects, the report indicates an approximate turnaround time for computing the gradient or weight updates in each of the federated learning rounds. In still other aspects of the present disclosure, the UE reports an approximate turnaround time for computing the gradients or weights, for example, as a function of battery status of the UE.

The reported machine learning hardware capability provides the base station with an approximate training time at the UE side, for preparing each gradient or weight update. For example, the base station can decide whether a reporting UE is a fast UE or a slow UE based on the reported machine learning capability. Consequently, the base station may group the UEs for different federated learning rounds according to machine learning capability. Slow UEs may be grouped with other slower UEs, while fast UEs are grouped with other faster UEs, improving efficiency of the federated learning process.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a machine learning (ML) capability reporting module 140. For brevity, only one UE 120d is shown as including the ML capability reporting module 140. The ML capability reporting module 140 may receive a machine learning model from a base station, and report a machine learning processing capability to the base station. The ML capability reporting module 140 may also transmit, to the base station, gradient updates or weight updates to the machine learning model.

The base stations 110 may include an ML capability grouping module 138. For brevity, only one base station 110a is shown as including the ML capability reporting module 138. The ML capability group module 138 may transmit a machine learning model to multiple user equipment (UEs). The ML capability group module 138 may also receive, from each of the UEs, a machine learning processing capability report. The ML capability group module 138 may further group the UEs in accordance with the machine learning processing capability reports, for receiving gradient updates to the machine learning model.

As indicated above, FIG. 1 is provided merely as an example. Other examples may differ from what is described with regard to FIG. 1.

Figure 2:
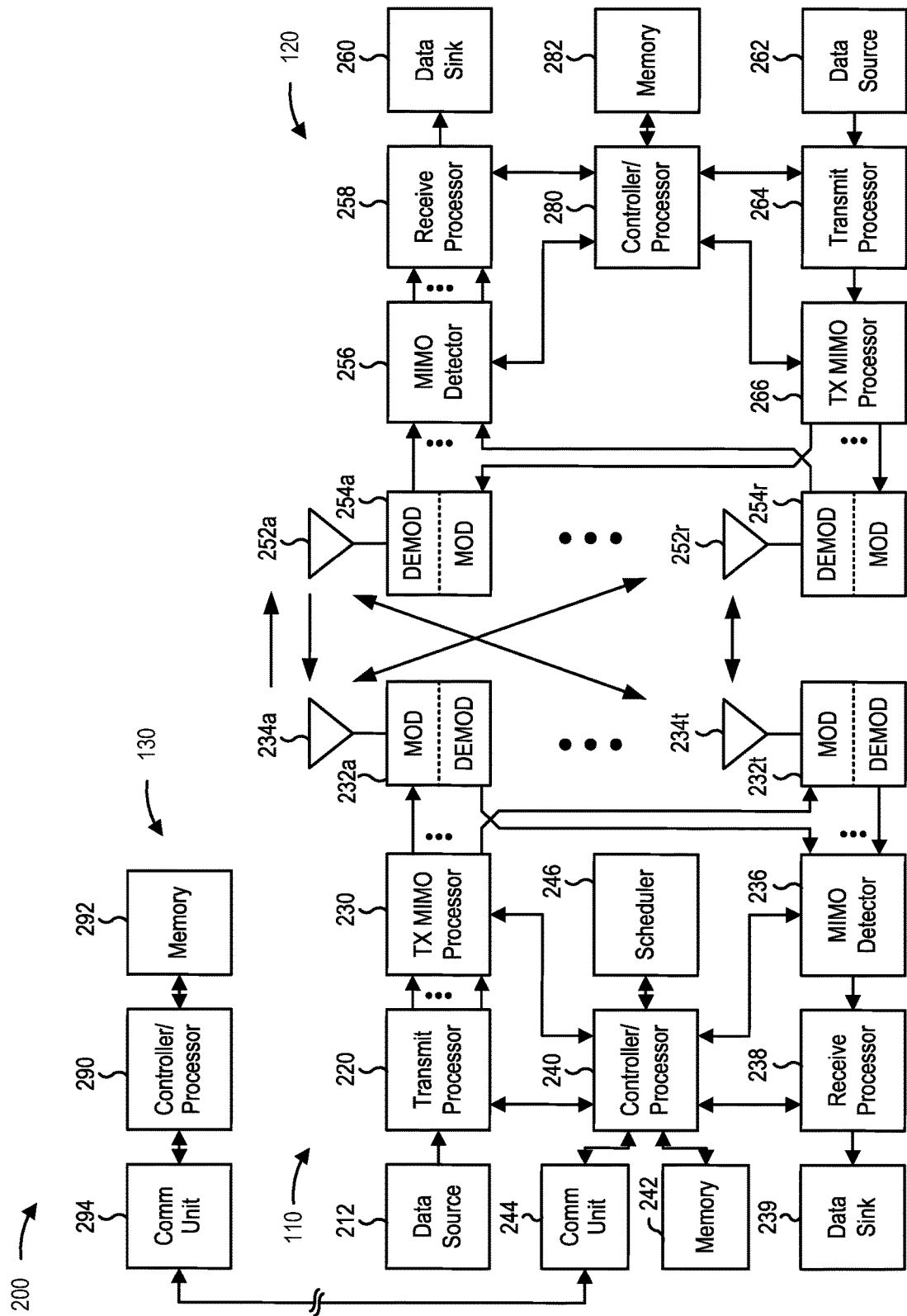
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning capability reporting, as described in more detail elsewhere. For example, the controller/processor 240 of the base station 110, the controller/processor 280 of the UE 120, and/or any other component(s) of FIG. 2 may perform or direct operations of, for example, the processes of FIGS. 7-9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or base station 110 may include means for receiving, means for reporting, means for transmitting, means for grouping, and/or means for scheduling. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
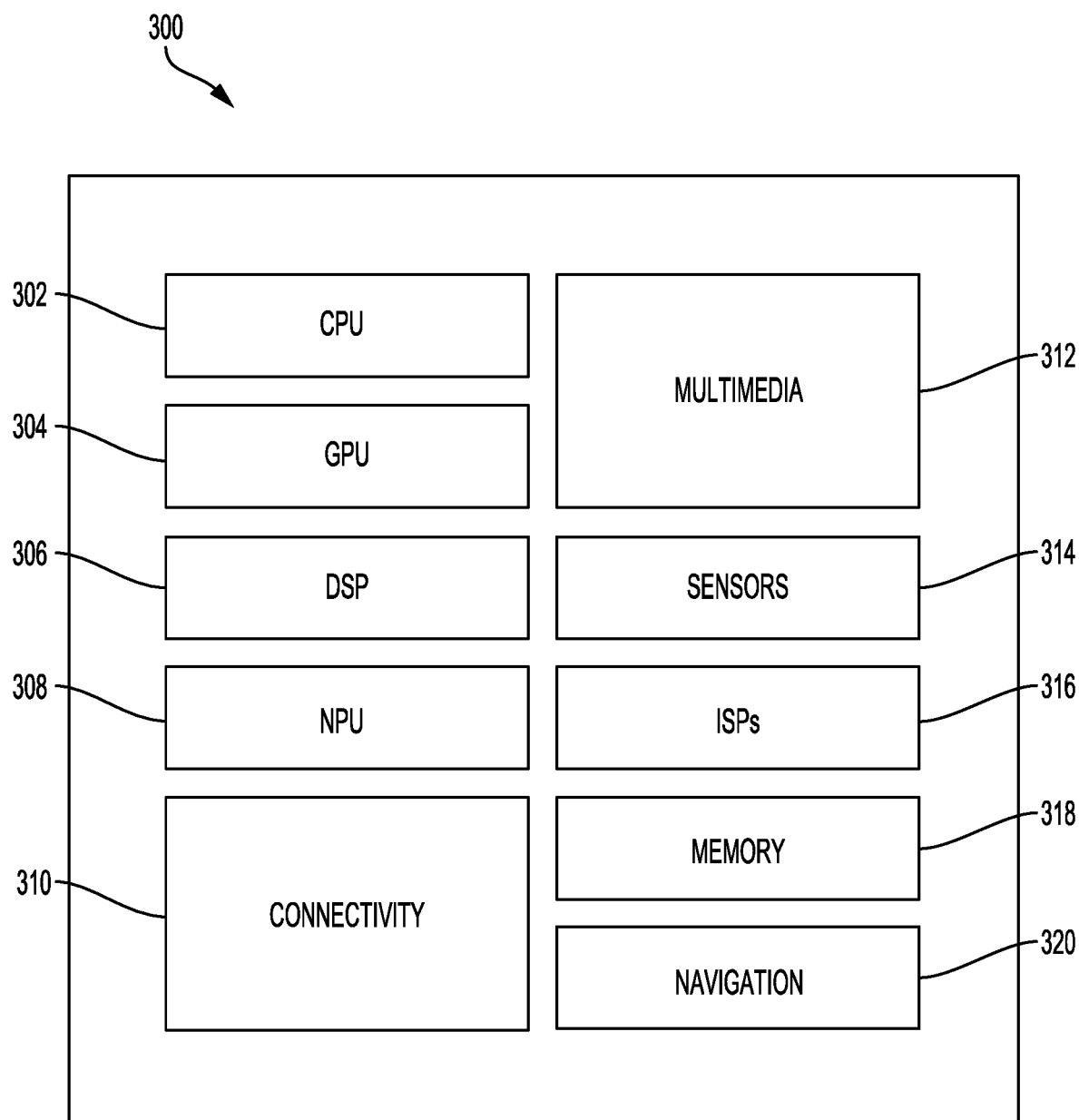
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In aspects of the present disclosure, the instructions loaded into the general-purpose processor 302 may comprise code to receive a machine learning model from a base station. The general-purpose processor 302 may also comprise code to report, to the base station, a machine learning processing capability. The general-purpose processor 302 may further comprise code to transmit, to the base station, gradient updates or weight updates to the machine learning model. In other aspects of the present disclosure, the instructions loaded into the general-purpose processor 302 may comprise code to transmit a machine learning model to multiple user equipment (UEs); and code to receive, from each of the of UEs, a machine learning processing capability report. The instructions loaded into the general-purpose processor 302 may also comprise code to group the UEs in accordance with the machine learning processing capability reports, for receiving gradient updates to the machine learning model.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
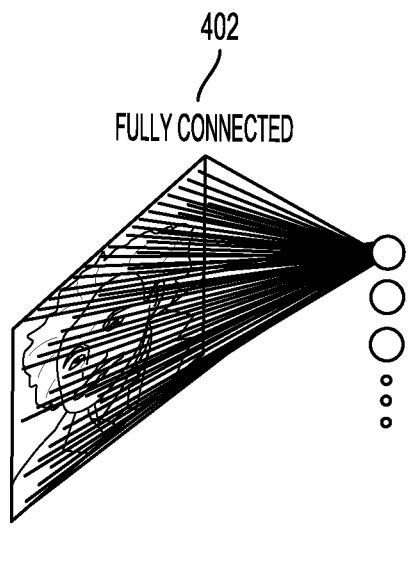
FIGS. 4A, 4B, and 4C are diagrams illustrating a neural network, in accordance with aspects of the present disclosure.
Figure 4B:
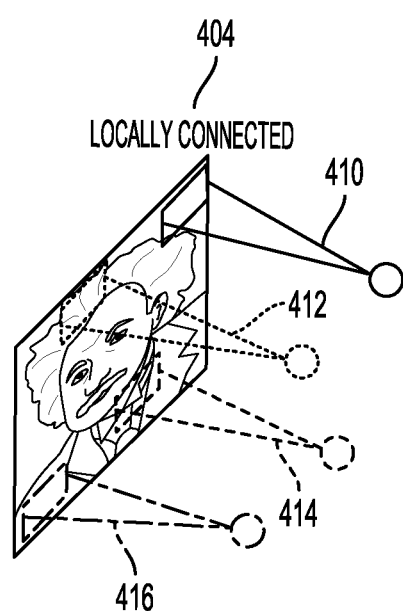

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
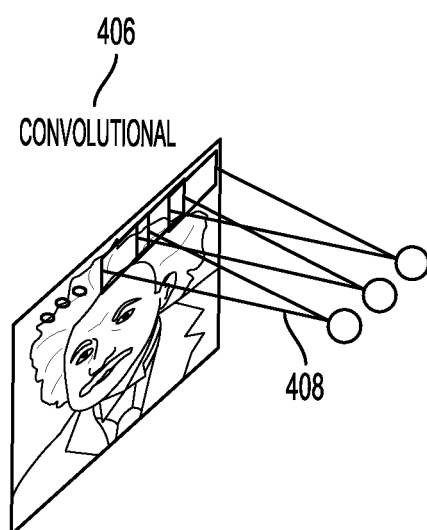

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
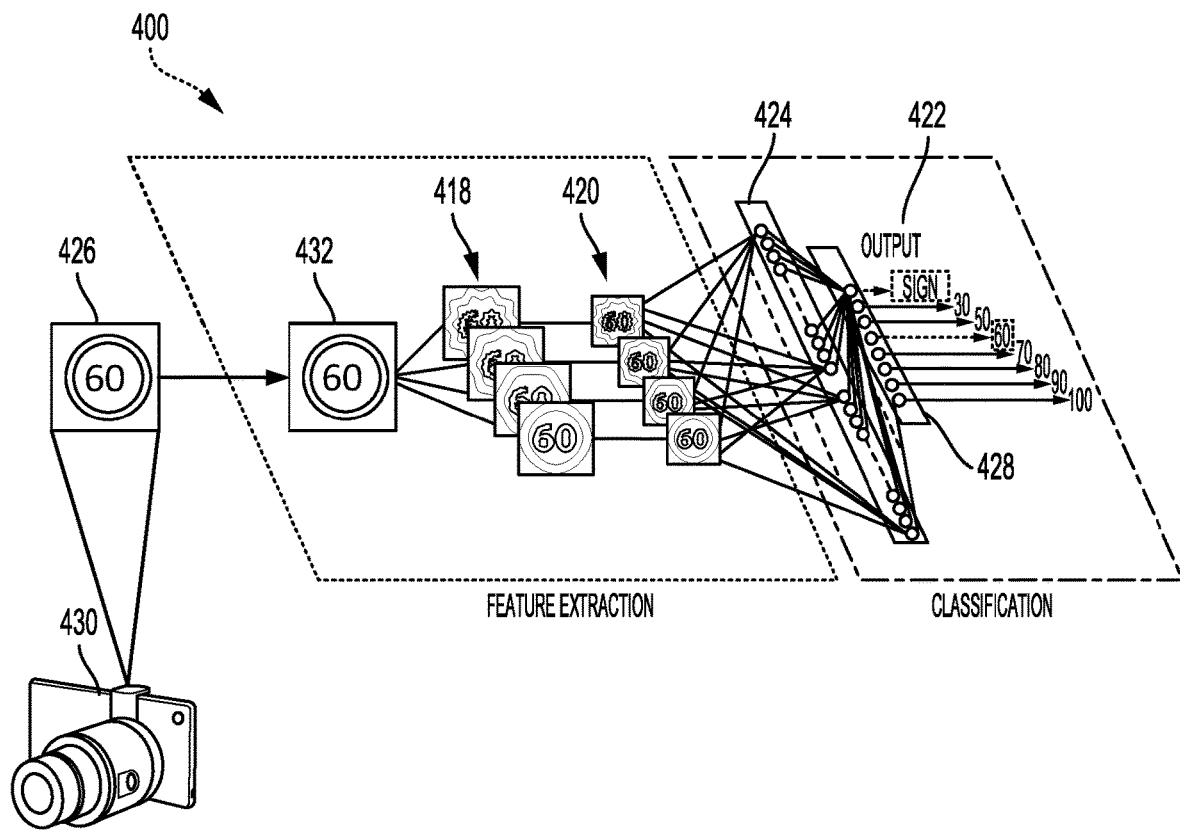
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
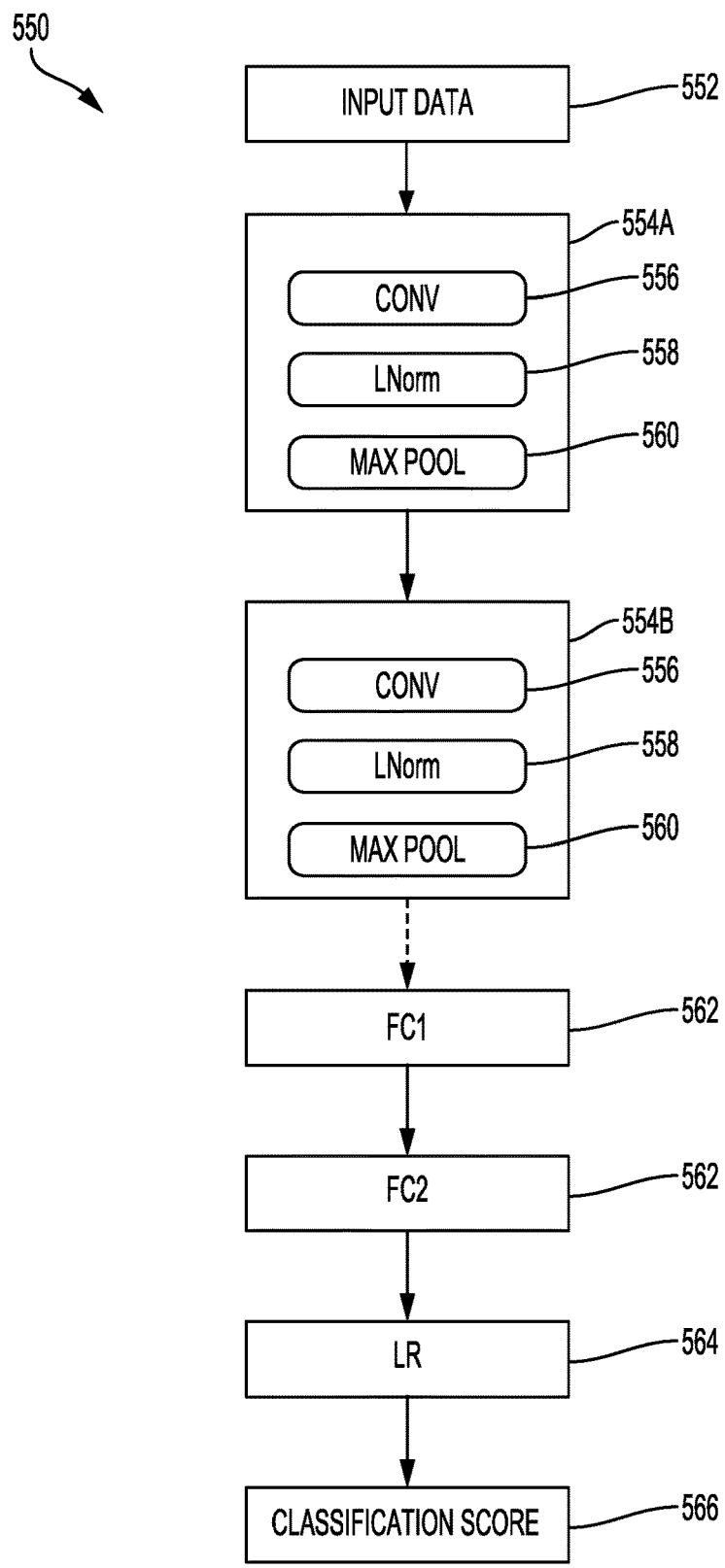
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As noted above, standard machine learning approaches centralize training data on one machine, or in a data center. In contrast, federated learning is a process where a group of UEs receives a machine learning model from a base station and work together to train the model. More specifically, each UE trains the model locally, and sends back either updated neural network model weights or gradient updates from, for example, a locally performed stochastic gradient descent process. The base station receives the updates from all of the UEs in the group and aggregates them, for example by averaging them, to obtain updated global weights of the neural network. The base station sends the updated model to the UEs, and the process repeats, round after round, until a desired performance level from the global model is obtained.

In each round of a federated learning process, a group of UEs sends back weights or gradient updates within a given time interval after they receive the model from the base station. If a UE misses a deadline for sending updates, the weights or gradients will become stale, and the base station will not incorporate the update in the weight or gradient aggregation for that round of the federated learning process.

According to aspects of the present disclosure, a UE reports its machine learning processing capability to the base station. In some aspects, the report may indicate a machine learning hardware capability. In other aspects, the report indicates an approximate turnaround time for computing the gradient or weight updates in each of the federated learning rounds. In still other aspects of the present disclosure, the UE reports an approximate turnaround time for computing the gradients or weights, for example, as a function of battery status of the UE.

Figure 6:
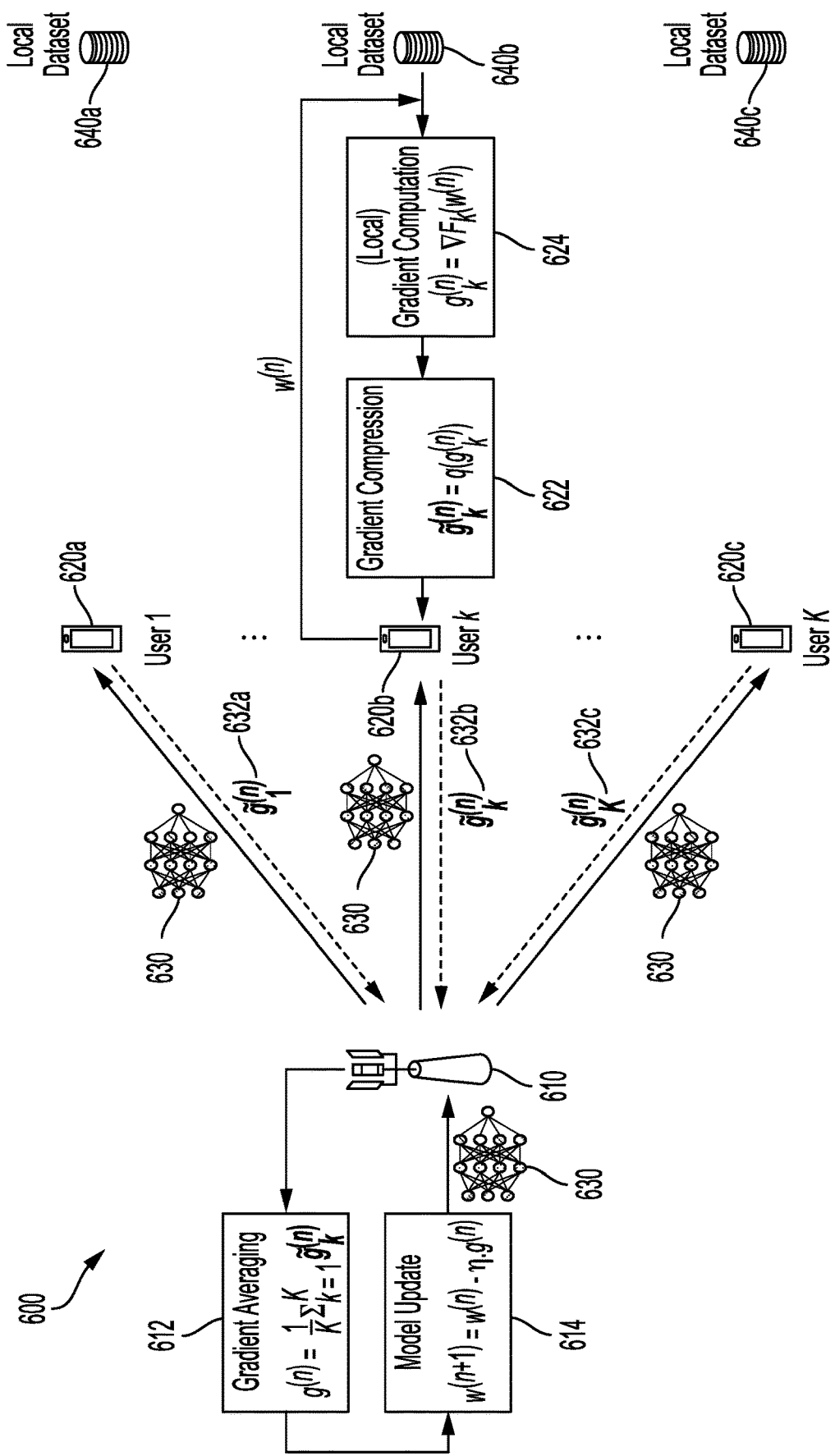
FIG. 6 is a block diagram illustrating federated learning, according to aspects of the present disclosure.

FIG. 6 is a block diagram illustrating a federated learning system 600 according to aspects of the present disclosure. In some configurations, a base station 610 (e.g., gNB) shares a global federated learning model 630 with a group of user equipment (UEs) 620 (e.g., 620a, 620b, 620c) participating in the federated learning process. In these configurations, the model parameters are optimized by the federated learning system 600. The model parameters $w^{(n)}$ represent biases and weights of the global federated learning model 630, $g^{(n)}$ represents the gradient estimates, where n is a federated learning round index. The initial model parameters are designated as $w^{(0)}$.

In these configurations, the UEs 620 each include a local dataset 640 (e.g., 640a, 640b, 640c), a gradient computation block 624, and a gradient compression block 622. In this example, the gradient computation block 624 of a second UE 620b is configured to perform a local update through decentralized stochastic gradient descent (SGD). Each of the UEs 620 performs some type of training iteration, such as a single stochastic gradient descent step or multiple stochastic gradient descent steps as seen in equation (1):

$$g_k^{(n)} = \nabla F_k(w^{(n)}), \quad (1)$$

where $F_k(w^{(n)})$ represents a local loss function for a weight w for the $n^{th}$ federated learning round, and $g_k^{(n)}$ represents a local gradient, for the $n^{th}$ federated learning round.

After the UEs 620 have completed the local updates $g_k^{(n)}$, the gradient compression block 622 may compress the computed gradient vector $g_k^{(n)}$ as seen in equation (2), to obtain the compressed values $\tilde{g}_k^{(n)}$, (e.g., 632a, 632b, 632c), where q( ) represents a compression function:

$$\tilde{g}_k^{(n)} = q(g_k^{(n)}). \quad (2)$$

The UEs 620 feedback the computed compressed gradient vectors $\tilde{g}_k^{(n)}$, (e.g., 632a, 632b, 632c) to the base station 610. This federated learning process includes transmission of the computed compressed gradient vectors $\tilde{g}_k^{(n)}$ 632 (e.g., 632a, 632b, 632c) from all the UEs 620 to the base station 610 in each round of the process.

In these configurations, the base station 610 includes a gradient averaging block 612 configured to average the computed compressed gradient vectors $\tilde{g}_k^{(n)}$ 632. Although averaging is shown, other types of aggregation are also contemplated. In addition, a model update block 614 is configured to update parameters of the global federated learning model 630. The updated model is then sent to all of the UEs 620. This process repeats until a global federated learning accuracy specification is met (e.g., until a global federated learning algorithm converges). An accuracy specification may refer to a desired accuracy level for local training. For example, an accuracy specification may indicate that a local training loss in each iteration of the federated learning process should drop below a threshold.

This global federated learning algorithm is based on a local loss function $F_k(w)$ as seen in equation (3):

$$F_k(w) \frac{1}{|D_k|} \sum_{(x_j, y_j) \in D_k} (w, x_j, y_j), \quad (3)$$

where $x_j$ represents an input vector to the model, $y_j$ represents an output scalar from the model, w is a weight vector of the global federated learning model, and $D_k$ represents a size of the dataset at the $k^{th}$ UE. For example, the input could be a vectorized image and the output could be the detected number (e.g., single scalar).

This global federated learning algorithm is also based on a global loss function F(w) (assuming $|D_k|=D$) as seen in equation (4):

$$F(w) = \frac{\sum_{k=1}^{K} \sum_{j=D_k} f_j(w)}{K \cdot D} = \frac{1}{K} \sum_{k=1}^{K} F_k(w). \quad (4)$$

An overall goal of this federated learning process is to obtain the optimal parameters for the neural network w* that minimizes the global loss function F(w):

$$w^* = \text{argmin } F(w). \quad (5)$$

In this federated learning process, local calculations of computed compressed gradient vectors $\tilde{g}_k^{(n)}$ 632 (e.g., for updating the global federated learning model 630) are gathered from the UEs 620, and an average is computed by the gradient averaging block 612 (or another type of aggregate estimate) as follows:

$$g^{(n)} = \frac{1}{K} \sum_{k=1}^{K} \tilde{g}_k^{(n)}. \quad (6)$$

Based on the average gradient $g^{(n)}$, the updated model parameters are transmitted (e.g., broadcast) from the base station 610 to the UEs 620. In addition, the model update block 614 of the base station 610 performs a model update as seen in equation (6):

$$w^{(n+1)} = w^{(n)} - \eta \cdot g^{(n)}, \quad (6)$$

where η represents a learning rate, which is a parameter of the global federated learning model 630.

In each round of a federated learning process, a group of UEs sends back weights or gradient updates within a given time interval after they receive the model from the base station. In one configuration, the group size is ten to twenty UEs. If a UE misses a deadline for sending updates, the weights or gradients will become stale, and the base station will not incorporate the gradient update from that UE in that round of the federated learning process.

If a base station is aware of the machine learning capabilities of the UEs participating in the federated learning process, this information could be useful to the base station. For example, a base station may group the UEs for different federated learning rounds according to machine learning capability. If slower UEs are grouped with faster UEs, the slower UEs will be a bottleneck for the training procedure, adversely impacting a convergence time of the federated learning process. Thus, slower UEs may be grouped with other slower UEs, while fast UEs are grouped with other fast UEs. Moreover, different UEs can be paired together for different rounds of the federated learning training process.

According to aspects of the present disclosure, a UE reports its machine learning processing capability to the base station. This machine learning processing capability report can be in a standardized format. For example, the report may be added to the UE capability report defined in 3GPP TS 38.306. The standardized format may indicate machine learning hardware capabilities of the UE, such as capabilities of the GPU, NPU, etc.

In aspects of the present disclosure, the report indicates a machine learning hardware capability in terms of standard metrics for the machine learning hardware capability. For example, the report may indicate a number of operations per second or a number of multiply-accumulate (MAC) operations per second, etc. These metrics are fundamental hardware characteristics of the UE and do not change over time.

The hardware characteristics may reflect a best case scenario. Thus, the report may indicate manufacturer specifications, such as tera-operations per second (TOP/s) or tera-multiply accumulate operations per second (TMAC/s). The manufacturer specified hardware capability may be closer to real world performance.

In any event, the reported machine learning hardware capability provides the base station with an approximate training time at the UE side, in order to prepare gradient or weight updates. For example, the base station may decide whether a reporting UE is a fast UE or a slow UE based on the reported machine learning hardware capability. The base station may schedule the UEs according to speed ranges. For example, UEs with a first range of processing capabilities may be included in a first group, while UEs with a second range of processing capabilities may be included in a second group. The processing capability may be a machine learning processing capability, in some implementations.

In other aspects of the present disclosure, the report indicates an approximate or estimated turnaround time for computing the gradient or weight updates in each of the federated learning rounds. The report may indicate a quantized time or an approximate time, for example.

The turnaround time is a function of the UE's machine learning hardware capabilities. The turnaround time is also a function of parameters, such as a type of federated learning process employed or an application associated with the particular federated learning process. The turnaround time may be a function of other parameters, such as a desired accuracy level of the machine learning model and/or the actual type of machine learning model being trained. Other parameters affecting the turnaround time include a learning rate for local training, and/or a number of iterations (e.g., stochastic gradient descent iterations) needed before deriving and sending an update.

A batch size for local training at the UE may also influence the turnaround time. For example, a smaller batch of training data takes less time to process than a larger batch of training data. It is noted that a smaller batch size increases the number of iterations.

According to aspects of the present disclosure, a base station may configure the UE with the above-mentioned parameters for a particular federated learning process. The UE can then assess the amount of time for computing the weight or gradient updates with the knowledge of these parameters, and report the (approximate) turnaround time. For this option, as long as the above noted parameters are fixed for a given federated learning process, the UE refrains from sending an updated report. When the parameters are reconfigured, the UE sends an updated report.

In other aspects of the present disclosure, the UE reports an approximate turnaround time for computing the gradients or weights, for example, as a function of battery status of the UE. For instance, if the UE is in power savings mode, the UE may decide not to participate in federated learning. The lack of participation may be implemented, for example, by setting the turnaround time to infinity. In other aspects, the turnaround time may be set to a large value.

It is noted that reporting machine learning hardware capabilities may be less dynamic than reporting a turnaround time. Moreover, reporting a turnaround time as a function of battery status is more dynamic than reporting the turnaround time more generally.

Figure 7:
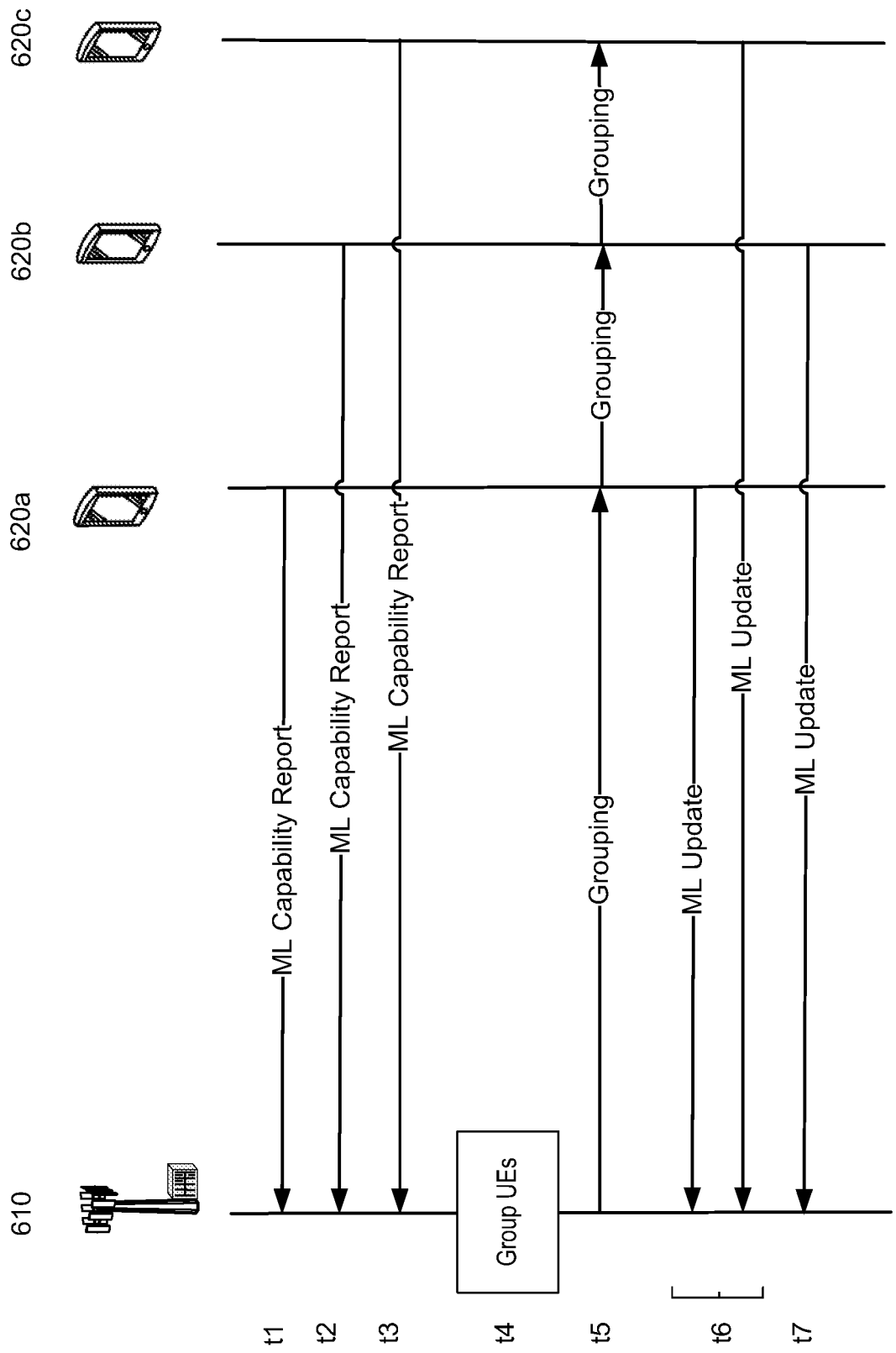
FIG. 7 is a timing diagram illustrating reporting of machine learning capabilities, according to aspects of the present disclosure.

FIG. 7 is a timing diagram illustrating reporting of machine learning capabilities, according to aspects of the present disclosure. At time t1, a base station 610 receives a machine learning (ML) capability report from a first UE 620a. At time t2, the base station 610 receives a machine learning (ML) capability report from a second UE 620b. At time t3, the base station 610 receives a machine learning (ML) capability report from a third UE 620c. The machine learning capability reports can indicate a machine learning hardware capability or a machine learning turnaround time, as described previously.

Based on the received machine learning capability reports, the base station 610 groups the UEs 620 at time t4 and schedules the UEs 620 in accordance with the groupings at time t5. In this example, the first UE 620a and the third UE 620c are grouped together as faster UEs. The second UE 620b is in its own group. Accordingly, at time t6, the first UE 620a and the third UE 620c send their updates to the machine learning (ML) model. The updates are computed locally at each UE 620, prior to transmission, and will be aggregated at the base station 610 for each round of federated learning. At time t7, the second UE 620b transmits its updates to the UE to be included in this round of federated learning. Due to the grouping of UEs 620, slower UEs may not miss deadlines for their round of federated learning updates. Accordingly, the base station considers a fuller set of updates and can train the model more quickly and accurately.

Figure 8:
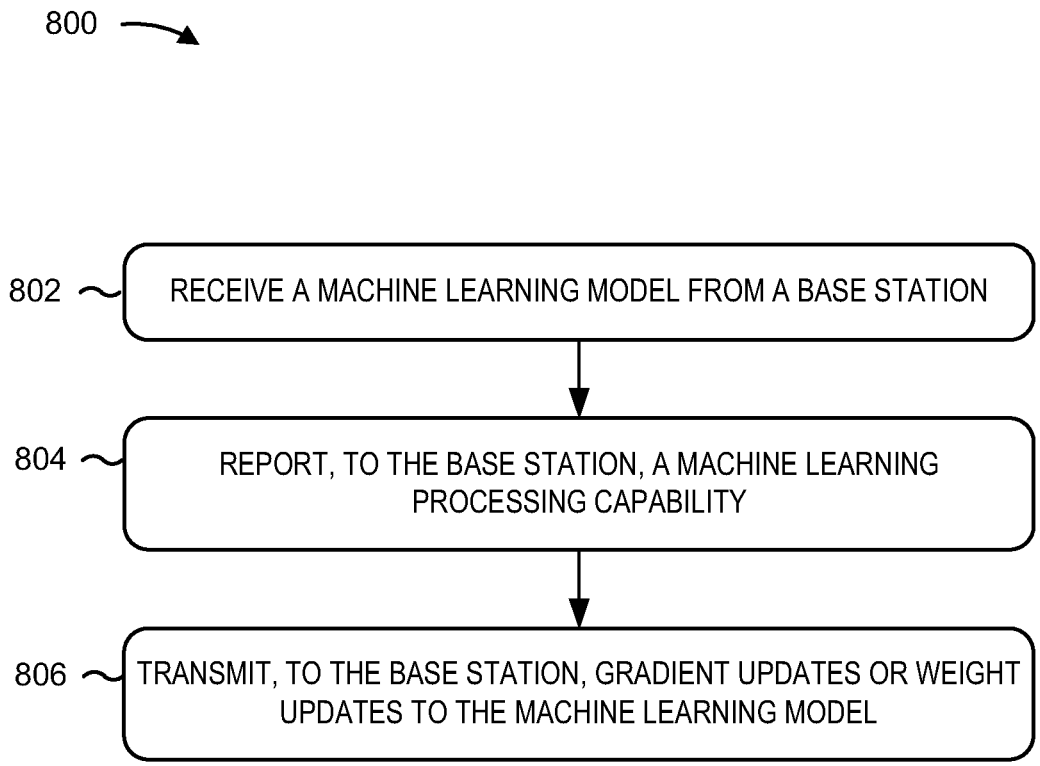
FIG. 8 is a flow diagram illustrating an example process performed, for example, by a user equipment (UE), in accordance with various aspects of the present disclosure.

FIG. 8 is a flow diagram illustrating an example process 800 performed, for example, by a UE, in accordance with various aspects of the present disclosure. The example process 800 is an example of user equipment (UE) capability reporting for machine learning applications.

As shown in FIG. 8, in some aspects, the process 800 may include receiving a machine learning model from a base station (block 802). For example, the UE (e.g., using the antenna 252, DEMOD/MOD 254, MIMO detector 256, receive processor 258, controller/processor 280, and/or memory 282) can receive a machine learning model. The machine learning model may be trained in a federated learning process.

The process 800 may also include reporting, to the base station, a machine learning processing capability (block 804). For example, the UE (e.g., using the antenna 252, DEMOD/MOD 254, TX MIMO processor 266, transmit processor 264, controller/processor 280, and/or memory 282) can report, to the base station, a machine learning processing capability. In some aspects of the present disclosure, the report may indicate a machine learning hardware capability. In other aspects, the report indicates an approximate turnaround time for computing the gradient or weight updates in each of the federated learning rounds. In still other aspects, the UE reports an approximate turnaround time for computing the gradients or weights, for example, as a function of battery status of the UE. This machine learning processing capability report can be in a standardized format.

The process 800 may further include transmitting, to the base station, gradient updates or weight updates to the machine learning model (block 806). For example, the UE (e.g., using the antenna 252, DEMOD/MOD 254, TX MIMO processor 266, transmit processor 264, controller/processor 280, and/or memory 282) can transmit, to the base station, gradient updates or weight updates. The updates may be calculated locally as part of a federated learning process.

Figure 9:
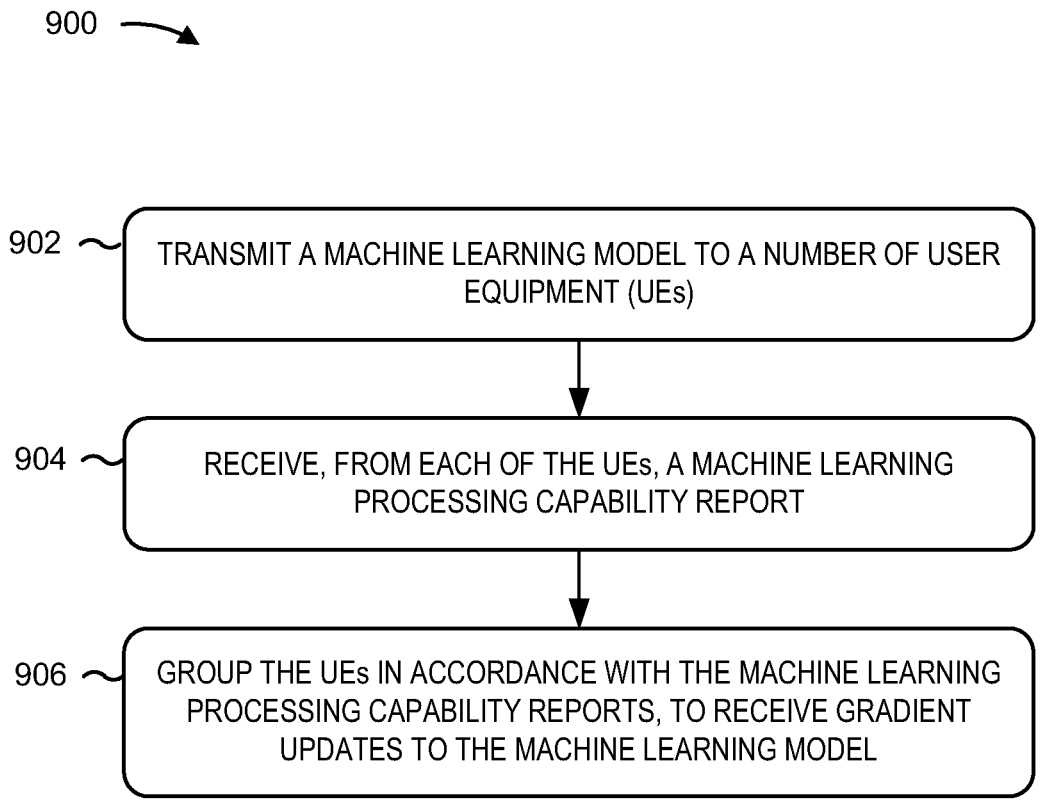
FIG. 9 is a flow diagram illustrating an example process performed, for example, by a base station, in accordance with various aspects of the present disclosure.

FIG. 9 is a flow diagram illustrating an example process 900 performed, for example, by a base station, in accordance with various aspects of the present disclosure. The example process 900 is an example of user equipment (UE) capability reporting for machine learning applications.

As shown in FIG. 9, in some aspects, the process 900 may include transmitting a machine learning model to a number of user equipment (UEs) (block 902). For example, the base station (e.g., using the antenna 234, MOD/DEMOD 232, TX MIMO processor 230, transmit processor 220, controller/processor 240, and/or memory 242) can transmit a machine learning model. The machine learning model may be trained in a federated learning process.

The process 900 may include receiving, from each of the number of UEs, a machine learning processing capability report (block 904). For example, the base station (e.g., using the antenna 234, MOD/DEMOD 232, MIMO detector 236, receive processor 238, controller/processor 240, and/or memory 242) can receive, from each of the number of UEs, a machine learning processing capability report. In some aspects of the present disclosure, the report may indicate a machine learning hardware capability. In other aspects, the report indicates an approximate turnaround time for computing the gradient or weight updates in each of the federated learning rounds. In still other aspects, the UE reports an approximate turnaround time for computing the gradients or weights, for example, as a function of battery status of the UE. This machine learning processing capability report can be in a standardized format.

The process 900 may further include grouping the UEs in accordance with the machine learning processing capability reports, for receiving gradient updates to the machine learning model (block 906). For example, the base station (e.g., using the antenna 234, MOD/DEMOD 232, MIMO detector 236, TX MIMO processor 230, receive processor 238, transmit processor 220, controller/processor 240, and/or memory 242) can group the number of UEs. For example, the base station may decide whether a reporting UE is a fast UE or a slow UE based on the reported machine learning hardware capability. The base station may schedule the UEs according to speed ranges. A set of higher speed UEs may be group together, while a set of slower speed UEs may be grouped together.

Example Aspects

Aspect 1: A method of wireless communication by a user equipment (UE), comprising: receiving a machine learning model from a base station; reporting, to the base station, a machine learning processing capability; and transmitting, to the base station, gradient updates or weight updates to the machine learning model.

Aspect 2: The method of Aspect 1, in which the machine learning processing capability comprises a machine learning hardware capability.

Aspect 3: The method of Aspect 1 or 2, in which the machine learning hardware capability comprises a manufacturer specified hardware capability.

Aspect 4: The method of any of the preceding Aspects, in which the machine learning processing capability comprises an estimated turnaround time for computing a gradient.

Aspect 5: The method of any of the preceding Aspects, in which the estimated turnaround time is based on a federated learning process, a federated learning application, a desired accuracy level for local training, a type of the machine learning model, a number of local training rounds, a batch size configured for UE training, and/or a learning rate for local training.

Aspect 6: The method of any of the preceding Aspects, further comprising receiving, from the base station, parameters for the federated learning process, the federated learning application, the desired accuracy level, the type of machine learning model, the number of local training rounds, the batch size, and/or the learning rate.

Aspect 7: The method of any of the preceding Aspects, further comprising reporting an updated machine learning processing capability in response to at least one of the parameters changing.

Aspect 8: The method of any of the preceding Aspects, in which the estimated turnaround time is based on a battery status of the UE.

Aspect 9: The method of any of the preceding Aspects, in which the estimated turnaround time is set to infinity in response to the UE operating in a power savings mode.

Aspect 10: A method of wireless communication by a base station, comprising: transmitting a machine learning model to a plurality of user equipment (UEs); receiving, from each of the plurality of UEs, a machine learning processing capability report; and grouping the plurality of UEs in accordance with the machine learning processing capability report from each of the plurality of UEs, for receiving gradient updates to the machine learning model.

Aspect 11: The method of Aspect 10, in which the grouping further comprises scheduling UEs with a first processing capability for transmitting the gradient updates in a first time period and scheduling UEs with a second processing capability for transmitting the gradient updates in a second time period.

Aspect 12: An apparatus for wireless communications by a user equipment (UE), comprising: a processor; memory coupled with the processor; and instructions stored in the memory and operable, when executed by the processor, to cause the apparatus: to receive a machine learning model from a base station; to report, to the base station, a machine learning processing capability; and to transmit, to the base station, gradient updates or weight updates to the machine learning model.

Aspect 13: The apparatus of Aspect 12, in which the machine learning processing capability comprises a machine learning hardware capability.

Aspect 14: The apparatus of Aspect 12 or 13, in which the machine learning hardware capability comprises a manufacturer specified hardware capability.

Aspect 15: The apparatus of any of the Aspects 12-14, in which the machine learning processing capability comprises an estimated turnaround time for computing a gradient.

Aspect 16: The apparatus of any of the Aspects 12-15, in which the estimated turnaround time is based on a federated learning process, a federated learning application, a desired accuracy level for local training, a type of the machine learning model, a number of local training rounds, a batch size configured for UE training, and/or a learning rate for local training.

Aspect 17: The apparatus of any of the Aspects 12-16, in which the processor causes the apparatus to receive, from the base station, parameters for the federated learning process, the federated learning application, the desired accuracy level, the type of machine learning model, the number of local training rounds, the batch size, and/or the learning rate.

Aspect 18: The apparatus of any of the Aspects 12-17, in which the processor causes the apparatus to report an updated machine learning processing capability in response to at least one of the parameters changing.

Aspect 19: The apparatus of any of the Aspects 12-18, in which the estimated turnaround time is based on a battery status of the UE.

Aspect 20: The apparatus of any of the Aspects 12-19, in which the estimated turnaround time is set to infinity in response to the UE operating in a power savings mode.

Aspect 21: A user equipment (UE) for wireless communications, comprising: means for receiving a machine learning model from a base station; means for reporting, to the base station, a machine learning processing capability; and means for transmitting, to the base station, gradient updates or weight updates to the machine learning model.

Aspect 22: The UE of Aspect 21, in which the machine learning processing capability comprises a machine learning hardware capability.

Aspect 23: The UE of Aspect 21 or 22, in which the machine learning hardware capability comprises a manufacturer specified hardware capability.

Aspect 24: The UE of any of the Aspect 21-23, in which the machine learning processing capability comprises an estimated turnaround time for computing a gradient.

Aspect 25: The UE of any of the Aspect 21-24, in which the estimated turnaround time is based on a federated learning process, a federated learning application, a desired accuracy level for local training, a type of the machine learning model, a number of local training rounds, a batch size configured for UE training, and/or a learning rate for local training.

Aspect 26: The UE of any of the Aspect 21-25, further comprising means for receiving, from the base station, parameters for the federated learning process, the federated learning application, the desired accuracy level, the type of machine learning model, the number of local training rounds, the batch size, and/or the learning rate.

Aspect 27: The UE of any of the Aspect 21-26, further comprising means for reporting an updated machine learning processing capability in response to at least one of the parameters changing.

Aspect 28: The UE of any of the Aspect 21-27, in which the estimated turnaround time is based on a battery status of the UE.

Aspect 29: The UE of any of the Aspect 21-28, in which the estimated turnaround time is set to infinity in response to the UE operating in a power savings mode.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving a machine learning model from a base station;
   reporting, to the base station, a machine learning processing capability indicating a turnaround time for the UE to compute a gradient for the machine learning model;
   computing gradient updates for the machine learning model in accordance with the turnaround time; and
   transmitting, to the base station, the gradient updates for the machine learning model.

2. The method of claim 1, in which the machine learning processing capability comprises a machine learning hardware capability.

3. The method of claim 2, in which the machine learning hardware capability comprises a manufacturer specified hardware capability.

4. The method of claim 1, in which the machine learning processing capability comprises an estimated turnaround time for computing the gradient.

5. The method of claim 4, in which the estimated turnaround time is based on a federated learning process, a federated learning application, a desired accuracy level for local training, a type of the machine learning model, a number of local training rounds, a batch size configured for UE training, and/or a learning rate for local training.

6. The method of claim 5, further comprising receiving, from the base station, parameters for the federated learning process, the federated learning application, the desired accuracy level, the type of machine learning model, the number of local training rounds, the batch size, and/or the learning rate.

7. The method of claim 6, further comprising reporting an updated machine learning processing capability in response to at least one of the parameters changing.

8. The method of claim 4, in which the estimated turnaround time is based on a battery status of the UE.

9. The method of claim 8, in which the estimated turnaround time is set to infinity in response to the UE operating in a power savings mode.

10. A method of wireless communication by a base station, comprising:
    transmitting a machine learning model to a plurality of user equipment (UEs);
    receiving, from each of the plurality of UEs, a machine learning processing capability report indicating a turnaround time for each of the plurality of UEs to compute a gradient for the machine learning model;
    grouping the plurality of UEs in accordance with the machine learning processing capability report from each of the plurality of UEs, for receiving gradient updates to the machine learning model; and
    receiving gradient updates from each of the plurality of UEs.

11. The method of claim 10, in which the grouping further comprises scheduling UEs with a first processing capability for transmitting the gradient updates in a first time period and scheduling UEs with a second processing capability for transmitting the gradient updates in a second time period.

12. An apparatus for wireless communications by a user equipment (UE), comprising:
    at least one processor;
    memory coupled with the at least one processor; and
    instructions stored in the memory and operable, when executed by the at least one processor, to cause the apparatus:
    to receive a machine learning model from a base station;
    to report, to the base station, a machine learning processing capability indicating a turnaround time for the UE to compute a gradient for the machine learning model;
    to compute gradient updates for the machine learning model in accordance with the turnaround time; and
    to transmit, to the base station, gradient updates for the machine learning model.

13. The apparatus of claim 12, in which the machine learning processing capability comprises a machine learning hardware capability.

14. The apparatus of claim 13, in which the machine learning hardware capability comprises a manufacturer specified hardware capability.

15. The apparatus of claim 12, in which the machine learning processing capability comprises an estimated turnaround time for computing the gradient.

16. The apparatus of claim 15, in which the estimated turnaround time is based on a federated learning process, a federated learning application, a desired accuracy level for local training, a type of the machine learning model, a number of local training rounds, a batch size configured for UE training, and/or a learning rate for local training.

17. The apparatus of claim 16, in which the at least one processor causes the apparatus to receive, from the base station, parameters for the federated learning process, the federated learning application, the desired accuracy level, the type of the machine learning model, the number of local training rounds, the batch size, and/or the learning rate.

18. The apparatus of claim 17, in which the at least one processor causes the apparatus to report an updated machine learning processing capability in response to at least one of the parameters changing.

19. The apparatus of claim 15, in which the estimated turnaround time is based on a battery status of the UE.

20. The apparatus of claim 19, in which the estimated turnaround time is set to infinity in response to the UE operating in a power savings mode.

21. A user equipment (UE) for wireless communications, comprising:
    means for receiving a machine learning model from a base station;
    means for reporting, to the base station, a machine learning processing capability indicating a turnaround time for the UE to compute a gradient for the machine learning model;
    means for computing gradient updates for the machine learning model in accordance with the turnaround time; and
    means for transmitting, to the base station, the gradient updates for the machine learning model.

22. The UE of claim 21, in which the machine learning processing capability comprises a machine learning hardware capability.

23. The UE of claim 22, in which the machine learning hardware capability comprises a manufacturer specified hardware capability.

24. The UE of claim 21, in which the machine learning processing capability comprises an estimated turnaround time for computing the gradient.

25. The UE of claim 24, in which the estimated turnaround time is based on a federated learning process, a federated learning application, a desired accuracy level for local training, a type of the machine learning model, a number of local training rounds, a batch size configured for UE training, and/or a learning rate for local training.

26. The UE of claim 25, further comprising means for receiving, from the base station, parameters for the federated learning process, the federated learning application, the desired accuracy level, the type of machine learning model, the number of local training rounds, the batch size, and/or the learning rate.

27. The UE of claim 26, further comprising means for reporting an updated machine learning processing capability in response to at least one of the parameters changing.

28. The UE of claim 24, in which the estimated turnaround time is based on a battery status of the UE.

29. The UE of claim 28, in which the estimated turnaround time is set to infinity in response to the UE operating in a power savings mode.

* * * * *